US008185539B1

(12) United States Patent
Bhardwaj

(10) Patent No.: US 8,185,539 B1
(45) Date of Patent: May 22, 2012

(54) WEB SITE OR DIRECTORY SEARCH USING SPEECH RECOGNITION OF LETTERS

(75) Inventor: Vinod K. Bhardwaj, San Jose, CA (US)

(73) Assignee: FoneWeb, Inc., Santa Clara, CA (US)

( * ) Notice: Subject to any disclaimer, the term of this patent is extended or adjusted under 35 U.S.C. 154(b) by 697 days.

(21) Appl. No.: 12/266,191

(22) Filed: Nov. 6, 2008

Related U.S. Application Data

(60) Provisional application No. 61/088,173, filed on Aug. 12, 2008.

(51) Int. Cl.
*G06F 17/30* (2006.01)

(52) U.S. Cl. ........................................ 707/756; 707/758

(58) Field of Classification Search .................. 707/756, 707/758

See application file for complete search history.

(56) References Cited

U.S. PATENT DOCUMENTS

| | | | | |
|---|---|---|---|---|
| 6,185,527 | B1 * | 2/2001 | Petkovic et al. | 704/231 |
| 2002/0035474 | A1 * | 3/2002 | Alpdemir | 704/270 |
| 2003/0126250 | A1 * | 7/2003 | Jhanji | 709/223 |
| 2005/0038657 | A1 * | 2/2005 | Roth et al. | 704/260 |
| 2007/0043730 | A1 * | 2/2007 | Wisely | 707/10 |

* cited by examiner

*Primary Examiner* — Hosain Alam
*Assistant Examiner* — Johnese Johnson
(74) *Attorney, Agent, or Firm* — Beyer Law Group LLP

(57) ABSTRACT

A mobile telephone is used to search the web site (or computer database) of an entity to find information such as in an FAQ. The user speaks the first few letters of a word (or the first few letters of each of a string of words) into the telephone. The spoken letters are converted into text, search words are formed and the search is sent to the web site. A match results in the answer to the question being returned to the user. Once the first letters are spelled out, the latter letters are essentially redundant, and software can figure out what the intended word is. Error correction is used if the user or speech engine makes a mistake. Confidence values are output by the speech engine when recognizing a spoken letter. The location of each letter and the number of letters spoken is taken into account when attempting a match. The search technique not only matches recognized letters, but also matches their determined location within a search word. The user is provided with a choice if there is more than one match. The user provides their preferred delivery means (voice, SMS, e-mail, facsimile, etc.) on input. Also, a Web server implements a telephone directory that may be citywide, statewide, countrywide or even global. A user speaks a few letters in order find a telephone number of a person or business.

9 Claims, 8 Drawing Sheets

410 420 430 440

| Question | Answer | Tally | Location |
|---|---|---|---|
| What Is Your Address? | Our Address is 123 Main Street | 45 | Northern California |
| What Are Your Hours? | Our hours are M-F 8 to 5. | 38 | Northern California |
| ⋮ | ⋮ | ⋮ | ⋮ |

400

FAQ List

| Name | Telephone No. | Tally | Caller ID | Tally | Caller ID |
|---|---|---|---|---|---|
| Joe Smith | (408) 555-1212 | 12 | 255-8001 | 1 | 255-8002 |
| John Smith | (415) 555-1212 | 53 | 255-8001 | 0 | 255-8002 |
| Josie Smith | (650) 555-1212 | 0 | 255-8001 | 82 | 255-8002 |
| ⋮ | ⋮ | ⋮ | ⋮ | ⋮ | ⋮ |

450

Telephone Directory

*FIG. 4B*

| Question (510) | Answer (520) | Fax Command (530) | Call Command (532) | Dial Command (534) | Email Command (536) | Text Command (538) | IM Command (540) |
|---|---|---|---|---|---|---|---|
| What is your Address? | Our address is: 123 Main Street | Fax your address to me | Call back with your address | Call number with your address | E-mail your address | Text your address | IM you address |
| What are your hours? | Our hours are: M-F 8 to 5 | Fax your hours to me | Call back with your hours | Call number with your hours | E-mail your hours | Text your hours | IM you hours |
| • • • | • • • | • • • | • • • | • • • | • • • | • • • | • • • |

500

FAQ List

*FIG. 5*

| Business Name | Telephone Number | Street Address | Domain Name | Business Category | Product Names | Landmark | Tally |
|---|---|---|---|---|---|---|---|
| XYZ Corp. | (408) 123-4567 | 123 Parkway | xyz.com | Electronics | Zapper, EZ-Remote, Picture X | Evergreen College | 48 |
| ⋮ | ⋮ | ⋮ | ⋮ | ⋮ | ⋮ | ⋮ | ⋮ |
| 710 | 715 | 720 | 725 | 730 | 735 | 740 | 745 |

700

Business Directory

*FIG. 7A*

| Name | Telephone Number | Street Address | E-mail Address | Gender | Employer | Occupation | Current Geographic Location | Tally |
|---|---|---|---|---|---|---|---|---|
| Joe Smith | (408) 555-1212 | 123 Main Street | joe@gmail.com | male | XYZ Corp. | Planner | San Jose CA | 48 |
| ⋮ | ⋮ | ⋮ | ⋮ | ⋮ | ⋮ | ⋮ | ⋮ | ⋮ |
| 755 | 760 | 765 | 770 | 775 | 780 | 785 | 790 | 795 |

750

Individual Directory

*FIG. 7B*

WEB SITE OR DIRECTORY SEARCH USING SPEECH RECOGNITION OF LETTERS

This application claims priority of U.S. provisional patent application No. 61/088,173 filed Aug. 12, 2008 which is hereby incorporated by reference.

FIELD OF THE INVENTION

The present invention relates generally to searching for information on a web site. More specifically, the present invention relates to a technique using speech recognition software that allows the user to perform a search using a mobile telephone.

BACKGROUND OF THE INVENTION

The use of mobile telephones is becoming more prevalent. More people now carry mobile telephones wherever they go; they expect a signal in most locations and expect to be able to communicate with others and to receive information virtually anytime and anywhere. But, the current technological climate hampers the ability of a person to perform queries and to receive information via a telephone.

An individual often finds himself in a situation where he or she desires information or an answer to question from a web site, but does not have ready access to a computer in order to answer his or her question. What the individual does often have, though, is a mobile telephone, land line, voice-enabled computer or other similar voice input device. In these situations it would be desirable to simply pick up the telephone and somehow query the web site and have the answer be delivered promptly. Even if the user is able to telephone the organization that owns the web site (for example), it can prove difficult for a user to find a person to speak with, let alone have a question answered.

And although progress in speech recognition technology has been steady, much improvement is still needed. For one, even the very best speech recognition software coupled with a high-quality, corded headset microphone can only achieve 90-95% accuracy. That means that about 1 out of 10 spoken words is recognized incorrectly by the software even under the very best conditions. For a user attempting to communicate with a service or web site owner by mobile telephone in order to find information, the conditions are far from optimal; the quality of the received user speech can be poor and dropped connections can occur. Generally, the quality of a live telephone connection (especially with mobile telephones, cordless home telephones, "smart" telephones, a VoIP connection, a SKYPE-type telephone service, etc.) can be poor compared with traditional, wired analog telephones. Any service that handles user speech arriving over a live telephone connection must deal with lower quality voice data. Also, any time user speech is being recorded over a live telephone connection there is always the possibility of drop-outs, static, dead zones, and a dropped connection. Therefore, attempting to use speech recognition technology to properly understand and answer a user's question originating from a mobile telephone can be challenging.

U.S. patent application Ser. No. 11/368,840 filed Mar. 6, 2006 entitled "Message Transcription, Voice Query and Query Delivery System" presents techniques for converting speech to text. U.S. patent application Ser. No. 11/763,870 filed Jun. 15, 2007 entitled "Speech Controlled Services and Devices Using Internet" presents techniques for controlling services and devices using voice. U.S. patent application Ser. No. 11/763,943 filed Jun. 15, 2007 entitled "Precision Speech to Text Conversion" presents techniques for enhancing speech recognition technology. Each of these applications is hereby incorporated by reference in its entirety.

Even in light of these new techniques, new improvements are welcome. Therefore, based upon the above state of technology and the needs of individuals, systems and methods are desired that would address the above problems.

SUMMARY OF THE INVENTION

To achieve the foregoing, and in accordance with the purpose of the present invention, systems and methods are disclosed that allow a user to query a web site using a voice input device such as a mobile telephone.

In a first embodiment, a mobile telephone is used to automatically search the web site of any corporation (for example) in order to find information that a user desires. Such information may include information typically found on the "About Us" page such as telephone numbers, office location, facsimile, hours, address, contact information, etc. The information also includes products or services, frequently asked questions (FAQs), employment opportunities, stock information etc. The automated search produces results similar or better to what would be produced if the user had to use a telephone and manually go through an interactive voice response telephone tree, or if the user had to speak to a person at the corporation to find the information (who might not be able to find information).

The user simply speaks the first few letters of a word (or the first few letters of each of a string of words) verbally into the telephone in order to perform a search. Once the user speaks the first portion of any number of words (and any spoken letters are converted into text), the search words are formed and the search is sent to the web site. The search words are then used to index into a list of frequently asked questions, for example. A match results in the answer to the question being returned to the user. If no question matches the search words sent, then the owner of the site knows they have to provide a response for future such queries. Thus, the web site improves in response to a determination of no match.

The present invention recognizes that it is easier for speech recognition software to recognize just the first few letters of a word that are spelled out by a user rather than attempting to recognize the entire word. Once the first letters are spelled out, the latter letters are essentially redundant, and other software can figure out what the intended word is. Thus, the user need only speak at most about sixteen letters into a mobile telephone in order to discover any needed information on any particular web site. Since the user will only be searching for a limited subset of information (such as hours, office location, telephone number, etc.), roughly a maximum of 40-50 words need be understood or recognized by the system.

In a second embodiment of the invention error correction is used. Using this technique it is not necessary to have all the letters recognized correctly and still achieve accurate recognition because there is much redundancy in language and because the set of target words may be limited.

It will still be possible to recognize a target word with slightly incorrect input because the incorrect input will produce a word that is not recognizable. Thus, by providing a predetermined vocabulary of possible target words only low recognition accuracy is needed for the input letters in order to achieve close to perfect recognition of the target words. Also, the speech recognition software provides a confidence value when recognizing a spoken letter. If the error correction software only uses those letters that have a high level of confidence then recognition of the target word increases. Further, the smaller the vocabulary of the set of target words, the higher the accuracy. Considering a list of frequently asked questions on a web site that has about 10,000 key words, it only requires about four letters be decoded correctly (i.e., with high confidence values) in order to correctly recognize the target word; if the rest of the spoken letters have low confidence, they can be ignored. In most of these situations this will result in only a single output match to be presented to the user.

In a third embodiment the location of each letter and the number of letters spoken is taken into account. Because the user is spelling the word to be searched, the speech recognition software is able to determine the location of each spoken letter within the word with near 100% accuracy, as well determine the number of letters in the word. These determinations will be highly accurate, as opposed to the recognition of each letter as mentioned above. Therefore, the search technique will not only match recognized letters, but also will match their determined location within a search word. For example, many vowels exist in any given document, but the probability that a specific vowel is located at a specific location within a word is low. In the case of consonants, the probability would be even lower. Thus, information on the location of a letter within a word can help recognize the correct key word on a web site, even with only a few letters being recognized by the speech recognition software. Further, if the user spells the entire word or indicates how many letters are in the word, this knowledge of the length of the word assists the speech recognition software in recognizing the correct word. Both of these techniques reduce the number of possibly correct words that would be presented to the user, thus making a selection easier.

In a fourth embodiment the user is provided with a choice if there is more than one match. In other words, in a case where there are multiple words that match the letters recognized or input by the user, the user will be given the option to choose from a list of words instead of asking the user to speak again (and instead of selecting an incorrect target word). Giving the user a choice avoids having the user to speak again which might introduce more recognition problems, and which could be an annoyance for the user. It is believed that there will be few cases where recognized letters results in a choice of multiple possible target words. Assuming that only letters with high confidence are used, and more than about three correctly recognized letters of a word are used, it will be possible to correctly recognize the target word and only in rare cases will there be more than one option to choose from.

In a fifth embodiment of the invention, a user provides their preferred delivery means along with an implied question in the form of a command to the query system. For example, should the user wish to retrieve the hours of a business from a web site, instead of spelling words that would ask a question such as "what are your hours during the week?", the user speaks a command into his or her access device such as "Fax your hours to me." The advantage of this embodiment is that the user can specify a delivery means (e.g., facsimile) that is different from the current means (e.g., mobile telephone) by which they are currently accessing the query system. The command also includes an implied query (e.g., "what are your hours?") through use of the word "hours." Of course, the user need not spell out (by speaking) each word in a question: the system may identify the desired command by recognizing only a few letters of keywords in the command. For example, the user may spell "F A H O U" ("fax hours") and that would be enough for the system to understand the command and fax the business' hours to the user.

In a sixth embodiment of the invention, a Web server implements a telephone directory that may be citywide, statewide, countrywide or even global. While a normal directory service only provides business names for a particular city (and thus allows searching for business telephone numbers), this embodiment provides many more fields and context that may be used by a user speaking a few letters in order to find or dial a telephone number of that business. The search words presented by the user may be very close to what a person might normally use when describing a particular business, such as "Indian Restaurant on El Camino," "Gas Station Corner of Center Road and Blossom Hill Road," or "Longs Drugstore near Evergreen College San Jose." Thus, any information provided in the directory associated with the business name may be searched by the user in order to determine the business telephone number. The business owner or the operator of the Web server may decide what information to provide for each business based upon questions often asked by callers. The caller simply speaks the letters of the keywords describing the business, is possibly presented with a list of likely businesses, and then selects the number to be dialed. This embodiment contemplates a central directory service for any number of companies or individuals, rather than a web site implemented by a single company solely for searching an FAQ pertaining to that company.

Thus, the above embodiments of the present invention solve the problem of retrieving information by telephone: keywords may now be correctly recognized with minimal input by a user. Recognized keywords can then be used to select a particular entry in a list of FAQs in order to provide an answer to the user's query. The ability to recognize keywords using minimal user input by voice is especially advantageous when using a mobile device because it can be time consuming and difficult for a user to formulate an entire question by voice. Further, it is not necessary for the user to ask a full, grammatically correct question, nor is it necessary for a web site or other service to be able to perfectly perform speech-to-text conversion of the entire question, let alone mapping that text version of the question into the answer desired by the user. In general, for all the embodiments, spelling more letters reduces the search space, creates a faster search, and can result in fewer multiple matches being presented to the user. Spelling fewer letters, though, can be easier for the user, and is often sufficient when the search space is smaller (i.e., searching only fifty words for a simple company telephone directory). Another advantage is that it is easier for speech recognition software to recognize a few simple letters over a telephone connection rather than attempting to recognize correctly entire words or sentences. Thus, the problems with received voice quality being poor—resulting in incorrect speech recognition—are avoided.

BRIEF DESCRIPTION OF THE DRAWINGS

The invention, together with further advantages thereof, may best be understood by reference to the following description taken in conjunction with the accompanying drawings in which:

FIG. 4A illustrates a typical FAQ list.

FIG. 4B is a typical telephone directory 450 that may be found on a Web server.

FIG. 5 is an alternative embodiment of an FAQ list.

FIG. 7A is a table illustrating one example of a business telephone directory that may be implemented and stored upon a Web server.

FIG. 7B is a table illustrating an example of an individual telephone directory that may also be implemented and stored upon a Web server.

DETAILED DESCRIPTION OF THE INVENTION

Figure 1:
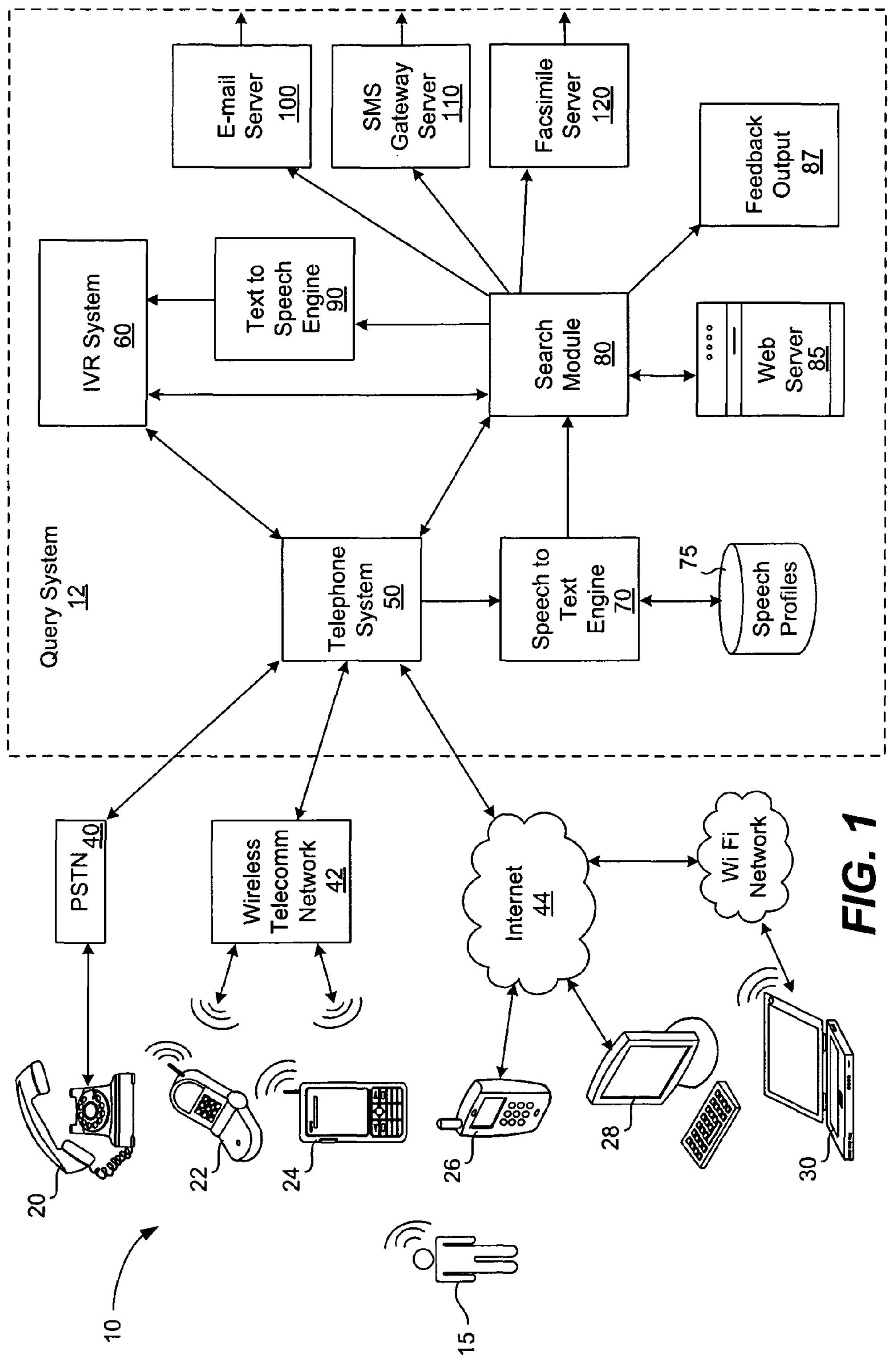
FIG. 1 is a block diagram showing an infrastructure that includes a query system.

The input device need not be limited to a mobile telephone but may also include a landline telephone (such as commonly found in homes), a laptop or desktop computer (having a suitable voice input device), or similar. At first, the user speech may be compared to a general profile, but over time a custom user profile is developed.

In a first embodiment, the user simply enters the first few letters of a word (or the first few letters of each of a string of words) in order to perform a search on any given web site. The letters may be entered by speaking into a telephone. For example, if the user is searching for the e-mail address or telephone number of the individual "JONATHAN SCOTT" whom the user believes is listed on the web site, the user may simply speak separately the letters "J O N A" to begin. Once the system recognizes the letters "J O N A" it performs a search of the listed individuals on the web site to find any individual name that matches with those letters. Because it is unlikely that more than one individual's name begins with those letters, the system is able to quickly and accurately return the desired information to the user. There is no need for the user to spell out the entire name of the user, let alone requiring the user to know the exact spelling of an individual's name.

In a second embodiment, error correction may be used. For example, suppose a user is trying to enter a name "JONATHAN" and the user speaks separately the letters "J O N A T H A N." If an error is made and the speech recognition software recognizes either the T as P or the H as F (or because the user's speech is unclear), it will still be possible to recognize the target word. Because there is no such word as JONAPHAN or JONATFAN in the English language or in a contact list on a web site, the system will recognize that such a recognized word is not the target word. If confidence values are used for each letter, then the system would recognize the name as either JONA?HAN or JONAT?AN and the system would be able to match with the target word JONATHAN which is in the list of words provided on the web site.

In a third embodiment, a search technique uses the location of a letter within a word and the number of letters in a word to narrow the choices. For example, assume that only a single letter is recognized within a word spelled by the user. If the letter "N" is recognized with near certainty as being the fifth letter in a word, this knowledge greatly reduces the number of possible correct choices in any given document, FAQ, web page, etc. And, if a second letter "T" is recognized as being the third letter in the word, the number of choices is even further reduced, and so on. In general, recognition of even a single letter in a target word along with its position in that word can reduce the list of possible choices by a factor of 10. Recognition of a second letter in the word along with its position can reduce the list by a factor of 100 or more.

In addition, in situations where the user is speaking and spelling the word under noisy conditions it may be useful to have user indicate in some fashion the length of the word. This goal may be accomplished by having the user spell the entire word (in which case the software can count how many letters are in the word), by having the user press a button or key indicating how many letters are in the word (i.e., pressing the numeral "4"), or by having the user speak a numeral (i.e., speaking the numeral "4"). In this situation, not only is the location of each letter known within a word, but also the length of the word is known. This knowledge by itself will also greatly reduce the list of possible choices by a large factor (i.e., the software knows it need only search for words having a length of four). Even knowledge regarding an approximate length of the word can help in reducing the choice of words to select from. Thus, this third embodiment presents techniques for how to reduce the list of possible words presented to the user when more than one choice is possible, thus greatly improving the ease-of-use of the system.

In a fourth embodiment a choice is provided to the user if there is uncertainty about the correct target word. For example, if the user spells out loud the word "E M A I L" and the speech recognition software is not able to accurately choose between the words "E-MAIL" and "V-MAIL" then the user will be provided with the choice of those two words. Further, if there is low confidence on the part of the speech recognition software regarding the first letter "E," then there is a greater chance that the system will present a choice of available words ending in "MAIL." Providing the user with a choice of words is better than requiring the user to speak again.

Alternatively, the user may be provided with a choice of words even when there is certainty about the correct target word. A choice may be provided for all known cases of common errors by human beings or by the speech recognition engine. For example, even if the speech engine is fairly confident (or even has 100% confidence) that a particular letter is a "P" and not a "B", the user will be given a choice of possible target words that appear in a list for the web site if the alternate choices include a "B" and not a "P". The error could be due to the user being mistaken, mispronunciation by the user, or incorrect recognition by the speech engine. For example, the user would be provided a choice between the following pairs of words if both words appear in the list: FAIL and SAIL, BET and PET, TEAR and DEAR. Further, the mispronounced (or misrecognized) letter in question need not be the first letter of a word; it could be any letter in the word.

Additionally, if the user enters a number of words, and this input string matches more than one entry in a list of FAQs (for example), the entry that has more matches will be provided first to the user, the entry with the second most matches will be provided next, and so on.

A further technique for deciding which entries in a list of matching FAQs (for example) to present to the user involves arranging the choices in the order of most frequently chosen by other users. If two or more entries are available for presentation to the user, the entry that has been most often selected by all other users is presented first. While this technique does not improve accuracy, it improves the response time to the user since the most likely answers are read out first. For example, a running tally may be kept that associates each FAQ entry (for example) with a number of times that that entry is selected by any user of the site. Or, the tally only keeps track of users who select the entry using the speech recognition system of the present invention. Or, the site assigns a priori a frequency number to each entry in order to preselect which entries might be read out first. Or, for each entry, the site keeps track of how many times a particular user has chosen that entry; when there are choices to present, only the number of times that that particular user has chosen an entry is taken into account.

This technique works well in cases where a user enters just a few letters and many choices are available. For example, if the user enters the letters "N U M", this could match the FAQ entry "What is the telephone number for the San Jose branch?," or "Does this medicine caused numbness?," among many other possible choices. The FAQ entry answer that has historically been chosen the most is read out first, thus saving time for the user. In cases where the system is used with a statewide, region wide, countrywide or even global FAQ site (or a telephone directory), greater time savings achieved. For example, if the user enters the number "3 7 2" this might be a query for an airline flight, the price of a product having that model number or the telephone number for a street address. The entry that has historically been chosen the most is read out first to the user.

As described above, a fifth embodiment allows the user to spell out a command indicating a preferred delivery means along with an implied question as will be described in more detail below. As mentioned above, this embodiment may require modification of an FAQ list or other list on the web site to be searched. The spelled command is then matched to a list of commands associate with a particular FAQ row. In the embodiments one through four above, it is not strictly necessary to modify any content on the web site to be searched, although the operator of the site does specify which FAQ list, other list, contact information, table, fields or web page that should be searched by search module 80 using the user's input text string.

As described above, the sixth embodiment provides a central service telephone directory allowing the user to enter any relevant keywords in order to find the telephone number of a particular business. Once the telephone number has been identified, the Web server may simply return that telephone number to the user via a preferred delivery means as described below or may automatically dial that telephone number for the user and connect the user's mobile telephone to the dialed number.

Query System Block Diagram

FIG. 1 is a block diagram showing an infrastructure 10 that includes a query system 12. Included are an individual user 15 and access devices 20-30 that the user may use to access the query system. Telephone 22 is any suitable telephone such as a traditional corded rotary dial, touch-tone telephone or cordless telephone that communicates over the public switched telephone network 40. Telephone 20 may also communicate using a VoIP (voice over IP) provider. Mobile telephone 22 is any suitable cellular (or other) telephone that communicates over any of a number of well-known wireless telecommunication networks 42. Telephone 24 is any of a number of so-called "smart phones" or PDAs (such as the BLACKBERRY, Apple iPhone, TREO etc.) that also communicates over network 42.

The user 15 may also place a VoIP call directly using an IP telephone 26 or a computer 28. For example, the user may use an analog telephone adapter to connect a standard telephone to his computer or Internet connection in order to place a VoIP call. Computer 28 may also be used with appropriate software and an Internet connection to directly place a VoIP call. Or, the user may use an IP telephone that has an Ethernet connector that connects directly to a router to place a VoIP call, or may use a Wi-Fi IP telephone to place a VoIP call from any Wi-Fi hot spot. The user may also use any suitable laptop computer 30 to access the Internet via any of a wide variety of Wi-Fi hotspots 46 around the world.

The access device, such as telephone 20, is used by the user to transmit his or her voice (preferably spelling or partially spelling input words as described below) to query system 12 in order to ask a question, request information, perform a task, execute command, or otherwise execute the desire of the user by using his or her speech input. Query system 12 may be implemented on a computer or computers of any suitable entity such as a corporation, government agency, business, individual, etc. The voice input from the user is received by the query system, converted to text, a search is performed, and the result is converted back to speech and played back to the user over his or her access device.

Telephone system 50 is any suitable telephone device, switchboard, telephone exchange, telephony server or system used by individuals or business to accept telephone calls from any of the known telecommunication means such as those shown. Telephone system 50 interacts with an IVR (interactive voice response) system 60 as is known by those of skill in the art to receive an incoming call, route the call based upon input, provide information and options, etc.

Speech-to-text engine 70 is any suitable speech-to-text engine capable of translating voice or audio data spoken by an individual into accurate text. Any suitable speech recognition software may be used such as Dragon NaturallySpeaking (version 8) or Nuance software available from Nuance Communications Inc., Via Voice (version 10) available from IBM, or Sphinx open source speech recognition (version 4) available from CMU. Preferably, the speech engine from LumenVox LLC of San Diego, Calif. is used. In one specific embodiment, speech translation is performed as described in the application referenced above entitled "Precision Speech-to-Text Engine." Text-to-speech engine 90 is arranged to perform text-to-speech conversion using any suitable voice synthesis software such as that available from AT&T, IBM, or Cepstral.

Search module 80 accepts the text output from engine 70 and performs a search as desired by the user over any suitable database. For example, a search is performed in information held by Web server 85 that is the Web server of the entity, individual or corporation that the user wishes to query as described below. The search module may also provide feedback 87 to the operator of the query system 12 in order to improve information on the Web server, searching techniques of the search module, etc. Output 87 maybe a database, file, monitor, etc.

Telephone system 50, e-mail server 100, SMS gateway server 110 and facsimile server 120 may each be used if the user desires to receive the answer to his query via any particular delivery means as described in more detail below. If the user desires a response over the current connection or by dialing another telephone number then telephone system 50 is used. If the user chooses an e-mail response or an instant message response than e-mail server 100 is used to deliver the response to the address provided by the user. SMS gateway server 110 provides a text message to a provided telephone number if the user chooses that option. Facsimile server 120 delivers the response by facsimile if the user provides a facsimile number. The response may be delivered to any of access devices 20-30 or to other suitable devices identified by the user.

Figure 2:
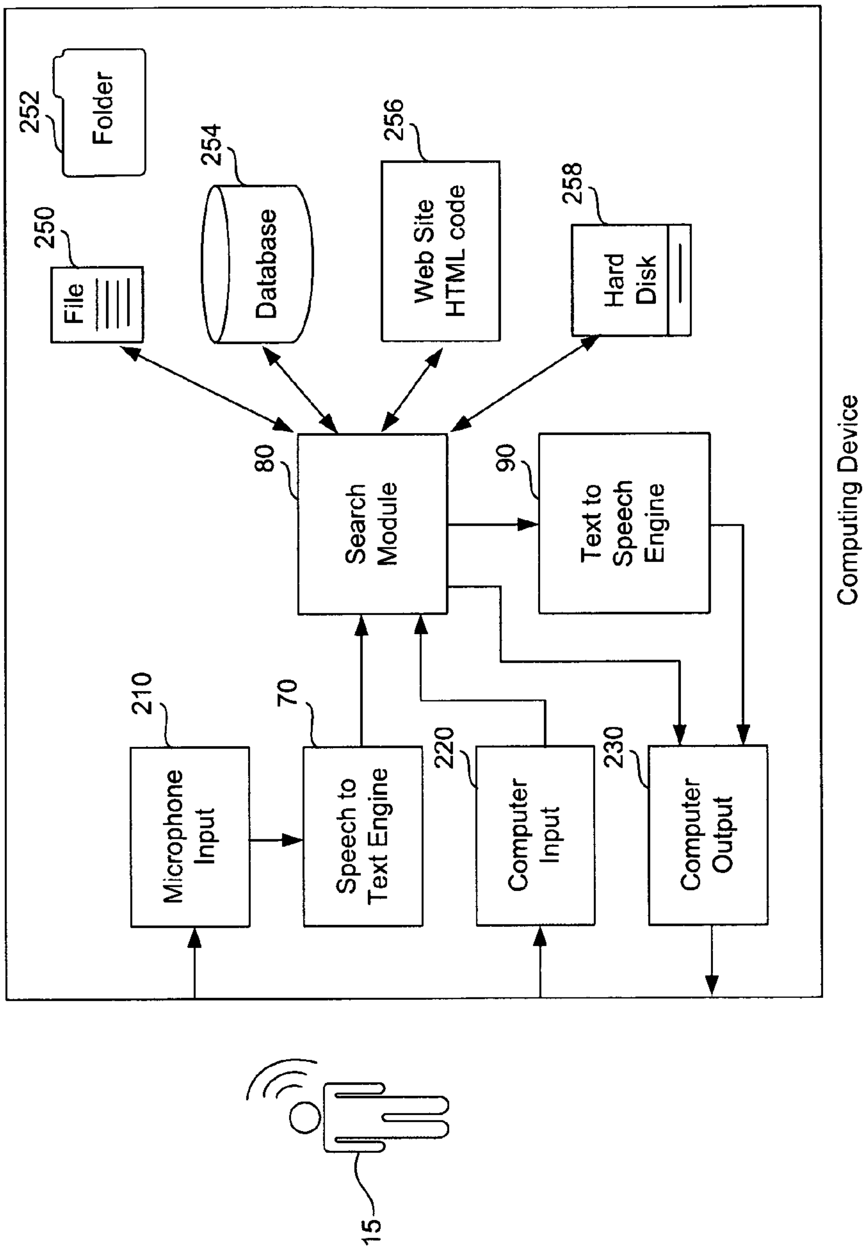
FIG. 2 illustrates a computing device with which the user performs a query.

FIG. 2 illustrates a computing device 200 with which the user performs a query. Unlike FIG. 1 illustrating that the user may perform a query of a remotely located web site (or other database) using any suitable access device, FIG. 2 illustrates that the user may simply be performing a query of his or her own computer. For example, computing device 200 may be a desktop computer, laptop computer, personal digital assistant, smart telephone, or other similar local computing device that the user may wish to query.

Computing device 200 includes many of the same modules from the query system 12 of FIG. 1, and also includes well-known input and output found on most computers such as a microphone input 210, a computer input 220 (including keyboard, mouse, touch screen, etc.), and a computer output 230 (including monitor, audio output, etc.). In this simple example, user 15 desires to perform a search of any of a variety of information held on the computer such as file 250, a folder or directory of data 252, a database 254, a web site 256, a hard disk 258, etc. One of skill in the art, upon a reading of the below description of the invention with respect to FIG. 1, will readily be able to apply the techniques to the embodiment of FIG. 2.

Figure 3:
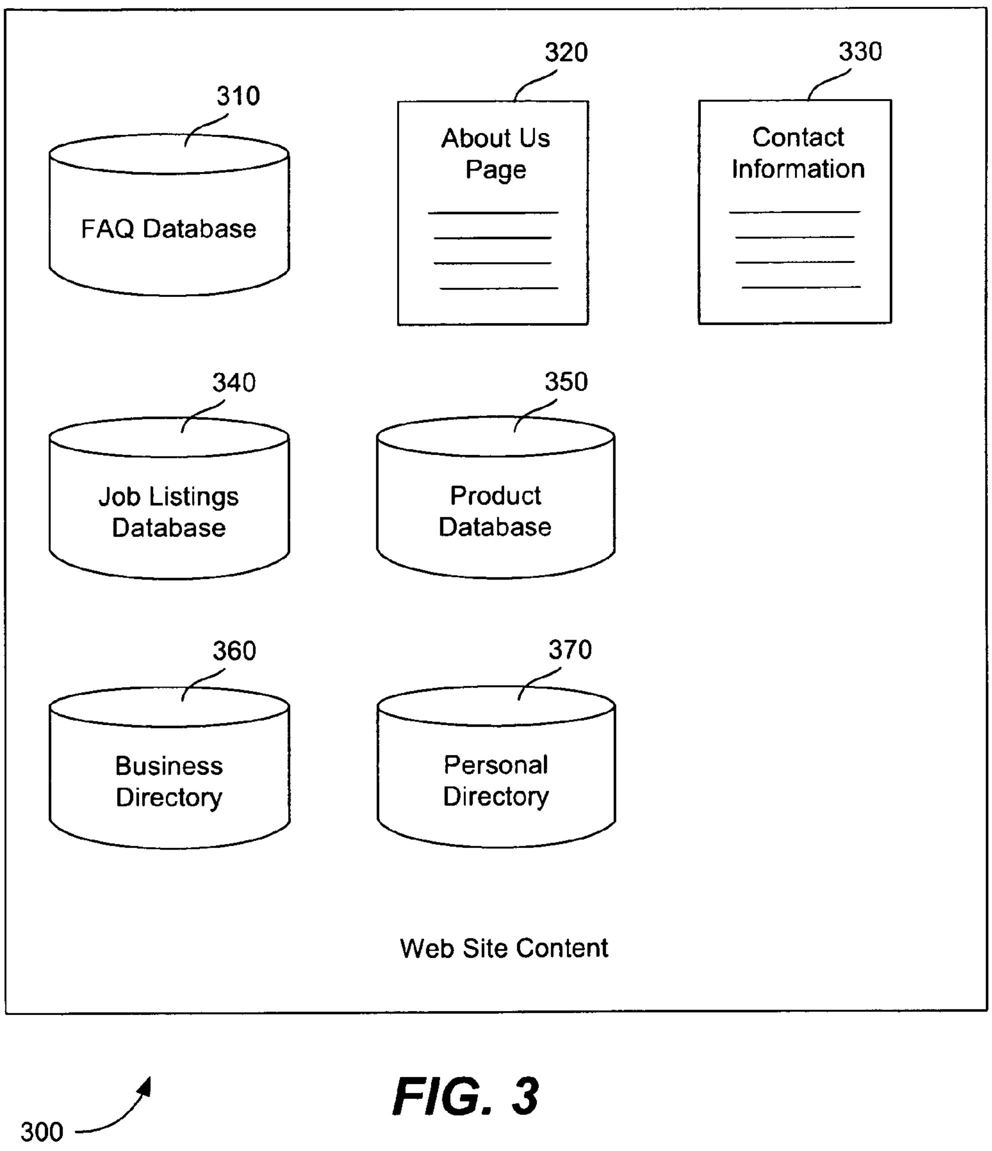
FIG. 3 illustrates typical information found in a web site.

FIG. 3 illustrates typical information found in a web site 300. As illustrated in FIG. 1, search module 80 may be arranged to perform a search on behalf of a user of any information on Web server 85 such as the information shown in web site 300. For example, FAQ database 310 is any list of questions and answers found on a web site including associated information. Page 320 is a page of information typically describing the company, history, founders, background, etc. The information may be held in a table or in designated fields so that a search query can perform a search of information and return a result. For example, a search of the term “Location” might return the address of the company. Contact information 330 is a table, list or other structured store of information listing names and telephone numbers, facsimile numbers, department names and telephone numbers, etc. Job listings database 340 is a list or database of job titles or openings along with job descriptions, salary, duties, availability, etc. Product database 350 is a list of products and/or services along with associated descriptions, price information, availability, etc. The operator of the web site structures the information in these various databases and pages so that a search query searches particular fields and will return a designated result for that particular search field. Of course, many other lists, tables or databases may be accessible via a web site or any URL, allowing user 15 to pose a query and to receive a result.

Also included within a Web server 85 (although not necessarily included in a web site accessible to the public) is business directory 700 and personal directory 750 shown in more detail in FIGS. 7A and 7B. These directories include the business and individual names, telephone numbers, and any other relevant identifying information. These directories are meant to serve as a central resource for a variety of businesses and individuals, and as such need not necessarily be displayed upon a web site, although such a use is possible.

FIG. 4A is a typical FAQ list 400. The list includes questions 410, corresponding answers 420 and a tally 430 of how many times this question has been asked by all users. Other information 440 such as the location from where the person is calling may also be associated with each tally 430. In this example, 45 calls have been received from the Northern California location asking for the address of the company. Location may indicate a region defined by a particular telephone area code and be determined simply by reference to the area code of the telephone of the person who is calling in (using caller identification, for example). Or, location is a particular country or city and is indicated by the country code or city code from the number where the person is calling. Additionally, location may be determined by referencing GPS data of the user’s mobile telephone that is transmitted to the query system when the call is made. This GPS data would allow location information 440 to be much more specific, for example by providing detailed longitude and latitude coordinates.

Location information 440 is tied to a particular tally, and there may be numerous pairs of tally-location information for each query. In other words, a tally will be kept for each location for each query. For example, if 45 users from Northern California have called about the address, 30 users from Southern California have called about the address, and 15 users from Nevada have called about the address, then there would be three tally-location pairs in the table. In this fashion, if a user is calling from Northern California then the questions are sorted in descending order based upon the tally data for the Northern California location, thus ensuring that a user from a particular location is provided with the most frequently asked questions from that location. In another example, if a particular question is asked 100 times by people from New York, but never by people from California, that question would not appear at the top of any sorted FAQ list for a caller from California because that particular question would likely not be relevant for that person. The tally number for the California location would be used to sort the FAQ list and provide the caller with the most relevant questions for his or her location.

If location information is not used, then tally 430 keeps track of how many times that each entry is selected by any user of the Web site (including access over the Internet and by a user of the present invention). Or, the tally only keeps track of users who select the entry using the speech recognition system of the present invention. Or, the site assigns a priori a frequency number to each entry in order to preselect which entries might be read out first, and then increases the number each time the entry is chosen.

Of course, many other types of information may be stored in a table or database where a search performed upon one field or column results in associated content being returned to the user. The associated content may be the matched field itself or an associated entry may be matched. For example, instead of an FAQ list, list 400 may be a telephone directory for a company, city or region that includes a person’s name followed by the telephone number. The present invention would thus perform a search over the list of names based upon an input text string in order to return the telephone number.

FIG. 4B is a typical (e.g., company) telephone directory 450 that may be found on Web server 85. The list includes names 460, telephone numbers will 470, and any number of tally-caller ID pairs 480-495 indicating how many times a particular telephone number has been accessed by a particular user. For example, tally 480 and caller ID 485 indicate that a user with a caller ID of “255-8001” has chosen the entry “Joe Smith” 12 times in the past, has called John Smith 53 times, and has never search for the name “Josie Smith.” A user with the caller ID “255-8002” has his own corresponding tally 490 and there may be any number of these pairs for any number of users calling in. Because such a telephone directory (for example) may be incredibly large (for a country-wide or global directory), in the case of multiple matches the order of entries read out to the calling user is important. Using the tally-caller ID pairs, the order of matching entries read out, displayed or presented to the calling user is based upon the tally count for that particular user. For example, user 255-8001 who accesses query system 12 and speaks the search letters “J O” might be presented with many thousands of matches if this is a citywide directory. Absent use of the embodiment shown in FIG. 4B, the user might be forced to spell the entire name “JOHN SMITH” in order to contact that person (and still may be presented with multiple matches). Using the tally-caller ID pairs, though, and after speaking only the letters "J O", that user would be presented with a multiple match list beginning with the name John Smith, followed by Joe Smith. No other matches would be presented to that user because based upon his tally count 480 no other people matching those two letters have ever been called by that person. Use of default settings may result in simply presenting only the top tally count to the calling user, making dialing frequently accessed people much easier.

Using these tally-caller ID pairs, the first time that a calling user searches for and retrieves the telephone number for a person may require speaking all the letters of that person's name and may result in multiple matches from which to choose. But, once the tally count for that particular person begins to increase, the calling user will need to enter fewer and fewer letters to access the telephone number of that person. In fact, for frequently called people, it may only be necessary to enter first letter that person's name in order to be presented with the telephone number of that person. Thus, even though the number of letters to be entered to match a particular name in the telephone directory increases dramatically with the number of total entries in the directory, using the above principle of tally-caller ID pairs and ordering based on frequency of usage will drastically reduce the number of input letters required to match a particular name that is frequently called.

Of course, the operator of Web server 85 may modify and structure any list 400 or 450 (for example) using a tally count as they so desire. For example, even for telephone directory, the tally counts may reflect the number of times that the entire user base accesses a particular telephone number, the number of times that a particular region accesses a telephone number, or the number of times that a particular calling user accesses a telephone number. Even for a list of frequently asked questions, a question that is repeated over time (whether by the user base, a region, or by a particular user) requires less input from a calling user the more times that the question is asked. Less input is required because the tally count will be used to present the multiple matches to the calling user in the order the question is most frequently asked. Thus, ordering multiple choices by tally count means that fewer letters need be entered. Further, if fewer letters are presented to the search module (because of user mistake, user mispronunciation, speech engine error, etc.), ordering choices by tally count can reduce the choices presented to the user.

FIG. 5 is an alternative embodiment of an FAQ list 500. The list includes questions 510, corresponding answers 520 and a series of commands 530-540, each command being associated with a particular question. The list is constructed so that typical commands that a user might have regarding a particular question are listed in the list 500. Should a user wish the query system to send a text message to a particular number with the address, the user would speak the letters of a command, "T E X T A D D R E S S," for example (or the first few characters of each word), and the system would then match the user's input with that command in column 538. Once the user inputs the telephone number for the text message, the system would then send a text message with the address in answer column 520 to that number. The advantage is that the user can have a particular command executed (and have the answer sent where they want) simply by speaking the letters that will match a particular command, rather than having the answer simply read back to them over the telephone connection by default. Of course, the operator of Web server 85 must modify the FAQ list (or any other database or list that is to be searched) to include commands 530-540.

An alternative embodiment involves an FAQ list that does not have columns 530-540; the user chooses a delivery method by spelling the name of the delivery method or by pushing buttons when interacting with IVR system 60. This alternative approach recognizes that once a specific FAQ entry is found (by searching the questions), the system simply needs to determine whether the user wants the answer played back via the current telephone connection, e-mailed to an address, faxed to a number, etc. Thus, after spelling a query word (e.g., A D D R E S S) and pushing the "*" key, for example, the user speaks or spells the mode by which he or she would like the address delivered. Thus, the user might spell "F A X" to indicate he would like the address faxed to him. Or, the IVR prompts the user to push a particular button depending upon how he or she would like the address delivered. Thus, the user is prompted to push "1 or telephone reply," "2 for fax reply," "3 for e-mail reply," etc. Alternatively, each user has a configuration profile and this configuration profile includes either an address or telephone number for each delivery means, or a single delivery means that should always be used. The advantage of this alternative approach is that no modifications to an existing FAQ list are needed.

Telephone Directory Embodiment

FIG. 7A is a table 700 illustrating one example of a business telephone directory that may be implemented and stored upon Web server 85. FIG. 7B is a table 750 illustrating an example of an individual telephone directory that may also be implemented and stored upon Web server 85. As discussed above, this sixth embodiment contemplates a central service that provides a telephone directory for any number of individuals, businesses or other entities, and may be citywide, nationwide, or even global. These tables may be implemented separately or may also be combined. Information for these tables may be provided by each business or individual in which case that entity decides which information to provide or not to provide. Alternatively, the operator of query system 12 retrieves this information from public telephone directories and other sources in order to populate the fields of these tables.

Table 700 includes the business name, telephone number, and any number of features 720-740 descriptive of that business that may be used when a caller is inquiring about that business and is attempting to find its telephone number. The telephone number field may also be expanded to include facsimile number, the number for various departments, customer service, general information, etc. Also included is a tally field 745 that keeps track of access by all users, access by users from a particular geographic location, or access by individual callers as explained above. A user calling into query system 12 may spell various keywords (or portions of keywords) included within this business directory in order to determine the telephone number for this business. Of course, the operator of Web server 85 and the designer of this table may also choose to return a different field to a calling user when the business is identified, instead of the telephone number. For example, if the operator concludes that most callers want the domain name of the business, then domain name field 725 would be returned to the calling user once the business is identified based upon a search as described below. As an example of a user searching for the telephone number of this corporation, the user may telephone query system 12 and spell all the letters "ELEC EVER", only being able to remember that there is an electronics company located near Evergreen College. The present invention would then search this business directory, match these search words with fields 730 and 740, and return the telephone number in field 715. It is also possible that multiple matches will occur, in which place the user would be presented with multiple choices, possibly ordered by tally 745.

Table 750 includes the name, telephone number, and any number of features 765-790 descriptive of the individual that may be used when a caller is inquiring about that individual and is attempting to find his or her telephone number. The telephone number field may also be expanded to include facsimile number, mobile number, home number, office number, etc. Also included is a tally field 745 that keeps track of access by all users, access by users from a particular geographic location, or access by individual callers as explained above. In particular, a tally-caller ID pair may be implemented as explained in FIG. 4B in order to assist callers who frequently call particular people.

Field 790 provides the current geographic location for the individual. As many people these days carry mobile telephones having locating abilities (using GPS or Wi-Fi triangulation, for example), it is contemplated that a mobile telephone of an individual will periodically broadcast the individual's location to query system 12 over or a cellular network or over a wireless Internet connection. The query system will then store this information on Web server 85 in field 790 for that particular individual. Thus, the individual's current geographic location is constantly updated. Even though the location data may be very detailed, field 790 may abstract that data to a wider regions such as a state, portion of the state, town, city or country.

A user calling into query system 12 may spell various keywords (or portions of keywords) included within this individual directory in order to determine the telephone number for the individual. Of course, the operator of Web server 85 and the designer of this table may also choose to return a different field to a calling user when the individual is identified, instead of the telephone number. For example, if the operator concludes that most callers want the e-mail address of the individual, then e-mail address field 765 would be returned to the calling user once the individual is identified based upon a search as described below.

As an example of a user searching for the telephone number of this individual, the user may telephone query system 12 and spell all the letters "JOE MAIN", only being able to remember that there is an individual named "Joe" living on Main Street. The present invention would then search this individual directory, match these search words with fields 755 and 765, and return the telephone number in field 760. It is also possible that multiple matches will occur, in which place the user would be presented with multiple choices, possibly ordered by tally 795. In another example, a calling user knows that an individual Frank living in California is currently traveling in Spain. In order to retrieve his telephone number, the user spells the search terms "FRA CAL SPA." Thus, the search engine matches these three partial search words with the fields of name, address and current geographic location in order to determine the correct record. Such a search using current geographic location is more likely to be accurate and fast because it is unlikely that there are very many people named Frank from California who are currently traveling in Spain.

Query System Flow Diagram

Figure 6:
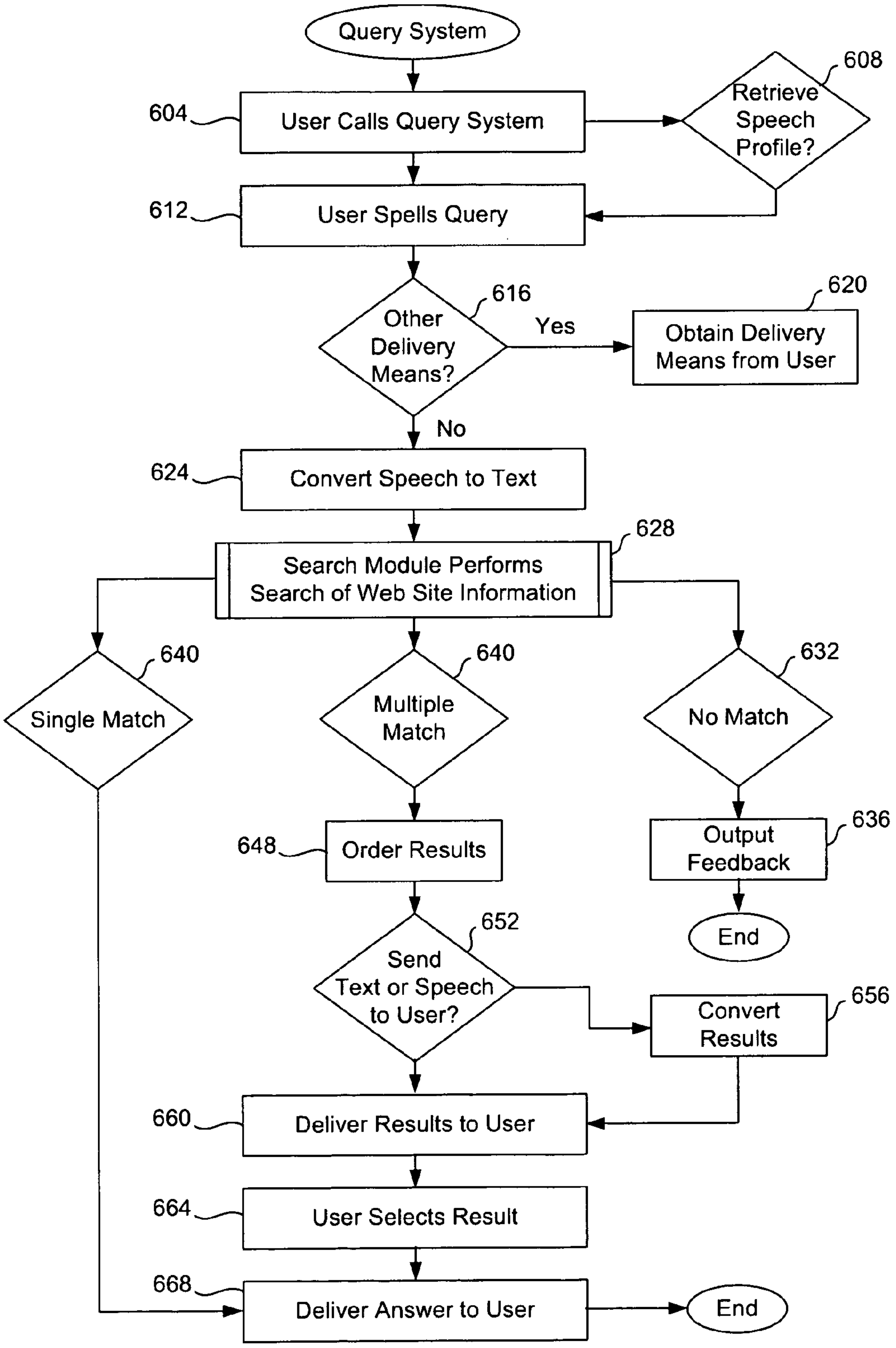
FIG. 6 is a flow diagram describing one embodiment for use of the query system.

FIG. 6 is a flow diagram describing one embodiment for use of the query system 12. In step 604 the user calls in to query system 12 using one of access devices 20-30 or similar. The user may dial a private speech service access number, may dial into a telephone system 50 operated by the owner of the web site, or may dial a query system-specific telephone number. According to the actual implementation, the user is presented with a welcome message, instructions, a prompt, or other directions on how to proceed. In one embodiment, only minimal or no instructions are needed as the user knows what to do and can immediately begin spelling his or her voice query. In other embodiments, the user may be prompted to select a particular country, region or language in order to assist with selection of a general speech profile for use. By default, a particular language and accent is assumed and the user is aware of this assumption. Once a connection is established, the connection is maintained while processing occurs and a result is readied for the user. In other words, this is a real-time service that processes a user's query and prepares a result while he or she waits on the telephone or at the computer. For alternative embodiments where the user requests a different delivery means, he or she may hang up the telephone once the query is delivered.

Optionally, the system 12 obtains a user identifier from the user or from his or her access device. For example, a caller identification service is used to obtain the user's telephone number, the user enters a number or PIN, or the user speaks a word or phrase. The user identifier is captured by the telephone system or by IVR system 60 and delivered along with the speech to speech-to-text engine 70. A user identifier may be useful for retrieving a custom speech profile, a regional speech profile, or for identifying a preferred user delivery means, but is not required.

If engine 70 will use a custom profile, then in step 608 the user identifier is used to retrieve the user's profile from speech profile database 75. Developing, storing and using custom user profiles has been previously described in application Ser. Nos. 11/368,840; 11/763,870 and 11/763,943. If not, then engine 70 will process the query using a general speech profile or perhaps a speech profile tailored to a particular language, country or region. Because engine 70 will be recognizing a discrete set of letters and a few additional words, it may not be necessary to use a custom user profile for each instance of speech recognition. In a preferred embodiment, the Lumenvox speech engine is used and no speech profile is provided.

In step 612 the user spells his or her query by speaking into the telephone access device. The user may spell all the letters of a particular query word, only the first few letters of the word, only the first few letters of a string of words in a query, or any other combination. The user may signal to the system that he or she has finished spelling by pressing a particular key, speaking a particular voice command (e.g., "Done"), pausing, etc. For a string of words in a query, the user may signal breaks between words by pressing a particular key, speaking a particular voice command (e.g. "Space"), pausing, etc. When finished, the speech letters may immediately be delivered to engine 70 for conversion into text. Or, the spoken letters are passed immediately to engine 70 while the user is speaking. Or, the spoken letters are temporarily saved into a sound file and then delivered to engine 70 once the user has finished speaking. Implicitly, the position of each letter in the spelled word and the length of the word will be recognized by engine 70. Alternatively, if greater accuracy is desired, the user may also enter the length of a spelled word by pressing a key on the access device or by speaking a numeral before or after the search word is spelled.

In an alternative embodiment, the user spells his query by entering the letters of the query, the letters of the first few words, or the first few letters of the keyword using the keypad on his or her telephone or keyboard. This embodiment is useful if the user is not in a position to speak the letters, under a noisy conditions or if the speech recognition is not operational. On a telephone, letter entry is performed similar to how a user enters a vanity number (e.g., "1-800-FLOWERS"), or how text messages are currently sent using the T9 mode. In the known T9 mode, the user simply presses the key once having the letter he or she wishes to use and software figures out what the correct spelling of the word should be. Alternatively, letter entry is performed in the so-called "spell mode" by pressing the numeral "2" once for the letter "A," twice rapidly for the letter "B," and thrice rapidly for the letter "C," etc. Or, a combination of the two modes may be used. If the software (or user) enters an incorrect letter for the word, the embodiment of error correction described herein will compensate.

In step 616 the user indicates whether a delivery means other than reading results back over the existing telephone connection is desired. By default, a choice of results and the final result will be converted into speech and read to the user over the current telephone connection. The user indicates a different delivery means by pressing a key recognized by the IVR system, speaking a command word (e.g., "Delivery"), etc. If a different delivery means is desired then in step 620 the user indicates the different means by speaking or spelling the means desired (e.g., FAX, E-MAIL, TEXT, DIAL, SMS, etc.), or by pressing a button in response to an IVR prompt (e.g., "press 1 for fax," "press 2 for e-mail," "press 3 for text displayed on your telephone," "press 4 to send the result by calling another telephone number," or "press 5 to send a text message to another number"). In one example, the user spells his query, presses a particular button and then speaks the means desired. This embodiment corresponds with the example FAQ List of FIG. 4 in which no modifications are needed to an existing FAQ list in order to implement a different delivery means.

An alternative embodiment corresponds with the example FAQ List of FIG. 5 in which additions to existing FAQ list are made. As shown, commands 530-540 are added to any number of entries directing the query system to deliver the results in a particular fashion. In this embodiment, the user indicates a different delivery means within the original query itself. For example, if the user desires the address of the organization, instead of spelling the question "What is your address?" in the original query, the user would spell the command "Fax your address to me." Of course, the user need only spell (by speaking) the first portion of one or more of the words in the command, e.g., "F A X A D D R," and then rely upon the query system to interpret that command. The system then matches the spelled query with one of the commands in columns 530-540 in order to return the appropriate answer in the matched row. By spelling any of the commands shown in FIG. 5, the user may also request delivery of the answer by calling back to his or her telephone, dialing another telephone number, sending an e-mail message, sending a text message, sending an instant message, etc.

In either of these two embodiments for indicating a different delivery means in step 620, the user also specifies a telephone number or electronic address. When specifying a delivery to a telephone number (such as by dialing a different telephone number, sending a text message, sending a facsimile, etc.), the user may simply speak the telephone number in response to an IVR prompt. For e-mail delivery, the user may spell his or her e-mail address by voice or may key in the letters on a telephone or keyboard. If on a telephone, one may use multiple rapid presses to differentiate between letters on a particular number key as is known in the art. For an instant message, the user also spells or keys in the instant message address. A "TEXT" command may mean returning text results (or the final result) to the user's current access device instead of converting the text to speech using engine 90, while a "SMS" command may mean sending a text message with a result to a different telephone number. IVR system 60 is used to prompt the user, provide directions, feedback etc. Another technique for identifying a different delivery means is to utilize the user identifier to access saved preferences of a particular user. For example, a certain user may always desire that his or her results be e-mailed to a particular e-mail address. Application Ser. Nos. 11/368,840 and 11/763,870 describe techniques for establishing user accounts, saving preferences and using identifiers to determine delivery means.

By default, no different delivery means is offered. In this situation, or when the user indicates that no different delivery means is desired, control then moves to step 624. If a different delivery means is specified, then IVR system 60 (in the case where the user presses a key to select a delivery means) or engine 70 (in the case where the user speaks or spells the delivery means) communicates to search module 80 the name of the desired delivery means for later use when the result is obtained. In the embodiment corresponding to FIG. 5 the delivery means is not identified until a command is matched to the FAQ list as described below. Alternatively, the specified delivery means may be delivered directly to search module 80 (in the case of entered characters or digits).

Next, in step 624 the speech input by the user is converted to text by speech-to-text engine 70. Any of the above-described speech engines may be used with or without a particular speech profile to perform the conversion. While a custom user profile may improve accuracy, a general language, or regional profile may suffice. In one particular embodiment, because query system 12 knows a priori that it will be converting spoken letters, numbers and perhaps a handful of symbols, and not every possible word in the English language, engine 70 may be constrained to only identify those spoken letters, numbers and symbols that query system 12 dictates. Because only these letters and numbers need to be recognized, engine 70 can be much more accurate and can recognize spoken letters and numbers from a wide range of individuals without utilizing a custom speech profile. In one embodiment, engine 70 is constrained to be in a special "spell" mode in which the engine recognizes only spoken letters, numbers, certain commands and punctuation. In this mode, one may spell any combination of letters, numbers or symbols and the engine will not interpret these as words. For example, if the user speaks "T" in spell mode, this will be converted to the text letter "T" rather than to the word "tea."

In a preferred embodiment, the Lumenvox speech engine is used without a speech profile. For the speech engine, each spoken letter is like another word that follows a previous word, unlike traditional speech recognition of an entire sentence where the words are all related by context. The speech engine acts on each letter (as if it were a distinct word) rather than on an entire sentence. Thus, a confidence value is provided for each spoken letter and not for the entire sentence as in traditional speech recognition. In other words, the speech engine does not try to find any context in a series of spoken letters because there is generally not any correlation between one letter in the next one. Letter correlation to identify words is performed by the below-described software (including error correction, comparison to FAQ, use of confidence values, etc.).

In one embodiment, accuracy information is output: a confidence value is output along with each letter, number or symbol that the engine recognizes. The accuracy information is a list of the recognized letters along with the confidence value for each letter indicating how accurately the output letter represents its spoken counterpart. For example, when transcribing the spoken letter "B" the speech engine might indicate that it believes an output of "B" is 95% accurate and that an alternative of "P" is 60% accurate. Should the engine recognize more than one possible output for a certain spoken letter, then each possible output letter is provided along with a value. For example, if the user spells "V M A I L," then the engine might output the following: "V" 95%; "E" 60%; "M" 100%; "A" 100%; "I" 100%; "L" 100%. Any suitable convention may be used to indicate that the first two output letters "V" and "E" actually correspond to the first position of the spoken word, while the subsequent letters correspond to the second, third, fourth and fifth positions respectively. Engine 70 also outputs to search module 80 the position of each letter in the spoken word (i.e., second, third, fourth, etc.) and the length of the word it has determined (i.e., three characters, eight characters, etc.).

Once the user's spoken letters have been converted to text the engine delivers this text (along with other outputs as described above) to search module 80. For example, should the user spell the word "A D D R E S S" then the text "ADDRESS" is delivered to the search module. Similarly, should the user partially spell the words "W H A" "I S" "A D D R," than the partial text words "WHA" "IS" "ADDR" are delivered to the search module. The user may spell one or more words, a portion of one or more words, or use punctuation, symbols or numbers in order to match a frequently asked question, command, or other field that the user knows is available for matching on the web site.

In step 628 search module 80 attempts to match the input text from engine 70 with the appropriate information in the web site (as dictated by the operator of the query system or the web site). For example, the search module matches the input text with information contained in the Web server 85. Details of this searching are provided below. Depending upon whether no match is found, a single match is found or multiple matches are found, control then moves to one of steps 632, 640 or 644.

In step 632 the search module determines that no information in the designated searched fields of Web server 85 matches the input text. In step 636 the search module outputs a "no match" result to IVR system 60 (for delivery to the user) and also provide feedback output 87 to query system 12 advising the system that a particular search resulted in no match. The system or operator may then take steps to add a query or information to its web site that would answer the question posed by the user. Alternatively, the result of "no match" is delivered to the user's specified delivery means (chosen above) as explained below.

In step 640 the module determines that a single entry in an FAQ list or other searched database does match with the input provided by the user. In step 668 the result is then delivered to the user. For example, if the input matches the second query in FAQ list 400 then the answer in column 420 is delivered to the user. Or, if the input matches the command regarding hours in column 530 then the answer in column 520 is then faxed to the user. Or, if the input matches any other field in a searched database having a corresponding answer or output, then that answer or output (or even the searched field itself) is delivered to the user. Delivery is discussed in more detail below with reference to step 668.

If the search module determines that multiple entries in an FAQ list (or in the table, list or database that is searched) match the input text, then in step 644 control moves to step 648 for the purpose of ordering the results for delivery to the user. Multiple entries may be ordered in many different ways for delivering to the user. In one technique, if the module has matched multiple entries because of the uncertainty about a correct target word (due to differing confidence values for certain letters), then that entry having a target word with the letter of higher confidence will be ordered first, and so on. Using the above example, the module would order the entry having the word "VMAIL" before the entry having the word "EMAIL" because the letter "V" has a higher confidence of being the actual letter that the user spoke.

In a second ordering technique, entries having words that have matched simply because a letter in the word sounds similar to the actual letter spoken will be ordered lower. For example, if the user spells the word "F-A-I-L" then an entry having the word "SAIL" might also match even if the letter "F" has a confidence value of 100%. In this situation, the entry having the word "FAIL" would come first and other entries having a different first letter for that word would come after. In a third ordering technique, if an input string of words matches more than one entry in the list of FAQs, then the entry that has more matches with the words in the input string will be provided first to the user, and so on.

A fourth ordering technique uses any of tally fields 430, 480, 490, etc., for the purpose of ordering the results for the user. If more than one entry has matched, then the entries are presented to the user in order of the descending tally number. The implementation of search module 80 dictates which particular tally number is used.

Once the module has ordered the multiple entries for delivery to the user then in step 652 the module determines whether the user prefers to receive text or speech on his or her access device. By default, synthesized speech is provided. Or, the user may indicate a preference using IVR system 60 at any point during the call. Or, a characteristic of the access method used by the user (e.g., telephone number, Internet access, etc.) may indicate that text should be preferred over speech. In any case, if text is preferred, in step 660 the text results determined by the search module are delivered to the user's access device for selection. Text may be delivered to a user's telephone or computer using techniques known in the art. If speech is preferred, in step 656 the text results are delivered to text-to-speech engine 90 for conversion into speech. The speech results are then delivered to the user via IVR system 60 for selection.

The results delivered to the user (either via text or speech) are the question entries in an FAQ list (for example) that have matched the user's original spelled query. For example, if the user's query matched three questions in an FAQ list, then these three questions will be displayed (or spoken) to the user for selection of the actual query that the user desires. In step 664 the user selects the appropriate query. If displayed, the user may use buttons on his or her mobile telephone to select a particular choice. If spoken, the user interacts with IVR system 60 to indicate the query that he or she desires (e.g., by pressing a particular button when the correct query is spoken back). Once the correct query is made known to the search module, then the search module selects the corresponding answer (for example) from the FAQ list, or other database that has been searched, for delivery to the user.

Step 668 delivers the answer to the user. As described above in steps 616 and 620, a default delivery means exists or the user has indicated a different delivery means. Based upon this known delivery means, search module 80 then take steps to deliver the result answer to the user. If via the current telephone connection, engine 90 is used to convert the answer into speech for the user, or the text of the answer is delivered to the user's access device. If via e-mail, then the text answer is communicated to e-mail server 100 (along with the user's earlier input e-mail address) for delivery. If via a text message, then the text answer is communicated to gateway server 110 (along with the user's earlier input telephone number) for delivery. If via facsimile, then the text answer is communicated to facsimile server 120 (along with the user's earlier input telephone number) for delivery. If via an instant message, then the text answer is communicated to a suitable server (along with the user's earlier input address) for delivery. If via a subsequent telephone call, then the text answer is converted to speech using engine 90, and telephone system 50 is provided with the earlier input telephone number in order to call and play back the answer. Once query system 12 has provided the answer to the user in some fashion, the telephone call may be ended.

Search Web Site Data Using Input Text

The below describes the search performed in step 628. As described above, input to search module 80 in step 628 is the text from engine 70 along with any accuracy information such as confidence values for each letter. This input may include a word or words fully spelled out, the first few letters of a word or words, the position of each letter, the length of each word or words, and a preferred delivery means (e.g. by facsimile). Alternatively, direct input from IVR system 60 may be received such as the length of the word or the delivery means.

As is known in the art, searching a list given a text string may be accomplished using a variety of techniques and algorithms. One of skill in the art, upon a reading of the below description of the different embodiments of the invention, will be able to employ a suitable algorithm to perform such a search. Also, the below embodiments may be implemented separately or may be combined depending upon the particular implementation.

In accordance with a first embodiment of the invention, the text input is the first few letters of a word or the entire spelled word. Any suitable algorithm may be used to attempt to match these few letters or the spelled word with any word in a list on Web server 85 that the operator of a query system 12 designated (e.g., the list of questions 410). If the entire word matches a word in a list, or if the first few letters matches the first few letters of any single word in the list, then that entry is returned as the single result and control moves to step 640. On the other hand, if the spelled word or the first few letters match more than one entry in the list, then these multiple entries are returned as the result and control moves to step 644.

In accordance with a second embodiment of the invention, the text input may include a word or words that either the user has spelled incorrectly or the speech engine 70 has converted incorrectly. Any suitable algorithm may again be used to match this text input with any word in a list on the Web server. It is not relevant to the algorithm whether a misspelling is due to the user not knowing how to spell the word, the user speaking incorrectly, or the speech engine converting incorrectly. Because the input word includes an incorrect letter, it will not be possible for the algorithm to perfectly match the input word to a word in the list (assuming such a word exists). The algorithm is able to match correct letters, and when an incorrect letter is encountered that letter is skipped and the algorithm continues to match letters from the input word against a word in the list. The algorithm may be fine tuned to decide what constitutes a near match of a word in the list having a letter or two or three incorrect, versus a significant number of letters not matching, in which case it is determined that no match exists. Preferably, having one or two mismatched letters with the rest of the letters matching is enough to make a determination that a match has occurred and that the user or engine has made a mistake.

Also in accordance with the second embodiment is the situation in which the text input also includes a confidence value for each letter. A confidence value is especially useful if the speech engine is unsure about a particular letter. In the case where the user spells a word or word incorrectly the confidence value will likely be high, but this is not a problem as a single incorrect letter may still result in a match occurring. In the situation where the speech engine gives a letter a very low confidence value, the algorithm uses this information to either ignore that letter for the purpose of matching, or still attempt to match the letter but not treat it as a mismatch if a match does not occur. For example, if the confidence value for a particular letter is below a particular value (e.g. 70%) then the speech engine may choose to ignore that letter and not attempt to match it to a letter of a word in the list (i.e., treat the low confidence letter as a wild card). Or, if the low confidence letter does not match any letters in a word, but all the other letters do match, the algorithm may determine that there are no mismatched letters in the word.

Also in accordance with the second embodiment is the situation in which the speech engine determines that two or more letters may actually be the correct letter for a particular position in a word, and supplies those letters along with confidence values (e.g., VMAIL vs. EMAIL, both "V" and "E" are supplied). In this situation, the algorithm may decide to ignore the letter with the lower confidence value, or may attempt to match each of these letters with a single position in a word. If any of the letters match the single position in the word, then that letter is treated as matching.

In accordance with a third embodiment of the invention, the location of each letter in a word and the number of letters in a word is taken into account by a search algorithm. The algorithm receives this information from the speech engine or directly from the IVR system 60 as explained above. For example, upon receiving information that the search word only has five characters, the algorithm makes an initial pass through the list on the web site to be searched screening out those entries that do not have any words of five characters. Further, if multiple words are entered, the algorithm is more efficient as it is then able to screen out entries that do not have the required number of characters per word for the multiple input words. Once the list has been narrowed, the algorithm may take into account known positions of particular letters within the input word. This embodiment is useful if in a noisy environment or due to a poor speaker or poor conversion, only a few letters can be identified within the input word. Since the position in the word of each letter is known, the algorithm takes this letter (or letters) and its known position and then further screens out any entry in the list that does not have the required letter in the required position. The algorithm may optimize its processing by focusing only upon consonants, vowels or only upon very infrequently used letters. For example, if the letter "X" is identified in the input search word at the third position, the algorithm searches for any word in the list on the web site that also has this letter in the third position. Because use of this letter is rare, searching is optimized and a match is likely to indicate the correct word that the user is looking for.

This technique is also useful if confidence values are taken into account. For example, if many of the letters have low confidence values (due to noise, a poor speaker or poor conversion), then the algorithm concentrates only on that letter or letters that have the highest confidence values. Since the position of the letter with the highest confidence value is known in the input word, the algorithm searches for this letter in that position in any of the words on the list to be searched. The algorithm may choose to focus on only a single letter, or may use two or more letters and their known positions to narrow down the set of matching entries. In a variation, narrowing the matching entries by looking at letter position is performed first, and then that set of matches is narrowed further by determining the correct length of the input word. In any case, if this embodiment matches a single entry than control moves to step 640, while if multiple entries match then control moves to step 644.

In accordance with a fifth embodiment of the invention, the input text is a command that includes the preferred delivery means. As shown in FIG. 5, the set of entries to be possibly matched by input text are found in columns 530-540. The algorithm proceeds to match the input text (that includes the preferred delivery means) with any of the entries in these columns. The input text may be as lengthy as spelling out all the words in an entry, may be as simple as spelling a couple of words ("FAX HOURS"), or even as simple as partially spelling a couple of words ("TEX ADDR"). The algorithm attempts to match this input text to the entries using any of the described embodiments. Once a match is found, the column of that match indicates the delivery means to be used, while the row of that match indicates the answer 520 to be delivered. In this embodiment it is less likely that multiple matches will be encountered.

In accordance with a sixth embodiment of the invention, a search is performed using the input text string upon a business or individual directory as shown in FIGS. 7A and 7B. A variety of search algorithms may be used to search the fields of these directories. For example, one technique assumes that the first name or phrase spelled by the user is likely to be the business name or individual name, in which case of these tables is searched for that first name. If multiple matches are found, then any remaining input search words (or portions of search words) are searched for in the remaining fields of these directories, one field at a time. Another technique assumes that the first word or partial word spelled by a user is equally likely to be found in any field of a given record; in this situation each field of a given record is attempted to be matched with a first search word, before moving on to the next record in the directory. Once a match is found in a given record, any remaining input search words are also attempted to be matched with remaining fields in that record.

Alternatively, any input search terms (or partial search terms) are separated out and searched in parallel in one of the directories. For example, if the search is being made in the individual directory and the input search terms spelled by the user are "JOE MAIN SAN" then three different searches are initiated in parallel in the individual directory record-by-record using the terms "JOE", "MAIN" and "SAN." (The search may also proceed column-by-column.) Once one of the three searches finds a record including one of search terms, then the other two searches immediately concentrate on that single record in order to determine if a match can be made with the other two search terms in any of the remaining fields. If so, then a match has occurred, if not then that record is eliminated and the three searches continue where they left off.

Other techniques may be used to a priori tell the search engine in which records or fields to search first using given search terms, for example, by dictating that the user must always spell the name or portion of a person's name first. In another embodiment, the search algorithm (whether in parallel or serially) attempts to match all of the search words (e.g., three search words) in a given record. If a match does not occur, then the search algorithm attempts to match two of the search words in any given record. Again, if not successful, then the algorithm attempts to match only a single search word (out of three) in a given record.

A fourth embodiment of the invention deals with the situation of multiple matches. The result of multiple matches is handled as described above in steps 644-664. The reasons that multiple matches might occur are varied. In a simple situation, a straightforward processing of input text of "ADDRESS" might return multiple matches simply because the web site lists numerous addresses for the various branches of the company. Or, if there is uncertainty about a particular letter (or letters) in a word (due to user error, low confidence value, or multiple letters output for single position), then the search algorithm will flag multiple entries as matching the user input. For example, the entries "EMAIL" and "VMAIL" in a web site list may both match a single user input word because the user mispronounced the first letter, because the first letter ends up with a very low confidence value, because the speech engine cannot recognize the first letter, or because the speech engine outputs both an "E" and a "V" for the first position of the search word. In this situation the user would be presented with a choice of both in order to determine whether the e-mail address or the voice mail number for a particular contact should be delivered to the user.

In a variation on this embodiment, the algorithm flags multiple entries as being matches when certain letters are spoken and multiple matches could result. For example, the letter pairs "F" and "S", "P" and "B", and "T" and "D" are considered close enough in sound that if we word contains one of these letters and there is another word in a different entry that includes the corresponding letter, then both entries will match and will be presented to the user. For example, two entries containing the different words "FAIL" and "SAIL" would be considered multiple matches even if the speech engine is confident that the first letter is an "F." Or, multiple matches would only occur in this variation if one letter from the letter pair has a confidence value below a particular threshold.

As described above when there are multiple matches, the tally field from FIGS. 4A and 4B may be used to determine which entries are listed out first to the user. Use of the tally field is especially useful if the calling user is calling in to a telephone directory or perhaps a list of frequently asked questions and often chooses a particular name or question. The user would then only have to enter a few letters to return a list of multiple matches. Even though the list of multiple matches may be quite large, the search module returns the tally field associated with a particular question or name so that the multiple matches are ordered in descending order of frequency of choice. In this fashion, the name or question that the calling user chooses most often will likely be at the top of the list and may be quickly chosen by the user.

Of course, should no match be detected, control moves to step 632 for further processing.

Computer System Embodiment

Figure 8A:
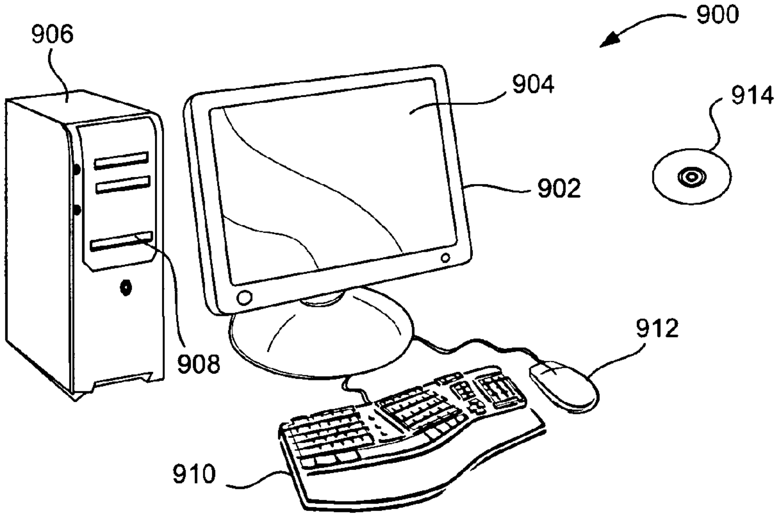
FIGS. 8A and 8B illustrate a computer system suitable for implementing embodiments of the present invention.
Figure 8B:
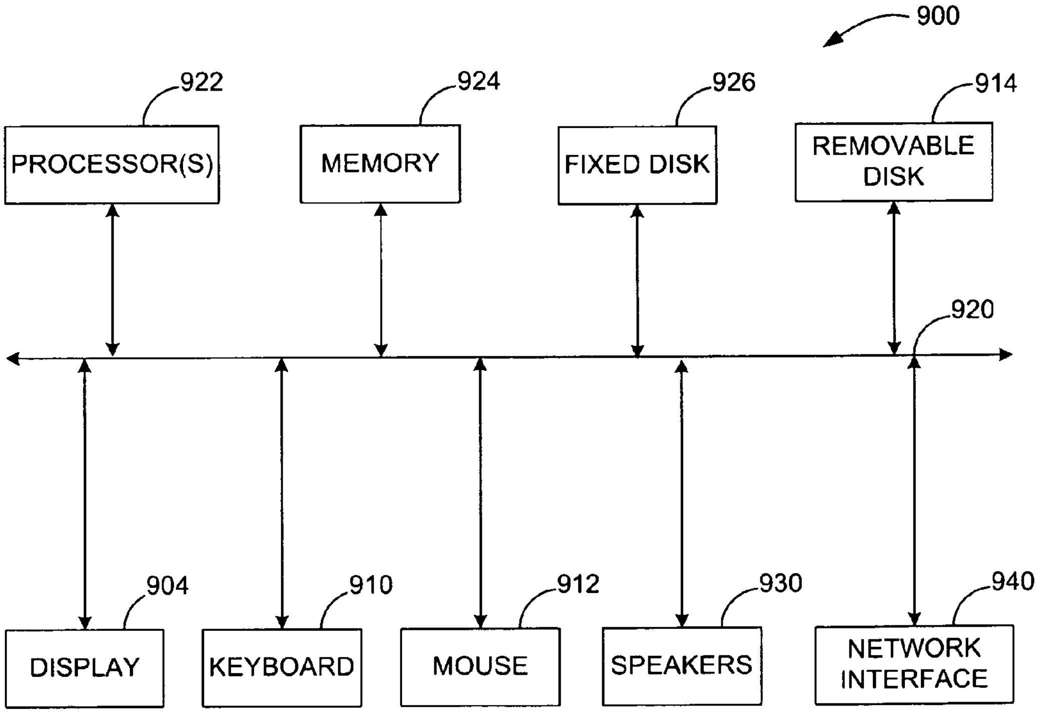

FIGS. 8A and 8B illustrate a computer system 900 suitable for implementing embodiments of the present invention. FIG. 8A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 8B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of searching a website using error correction, said method comprising:

accepting a call over an initial communications network from a user using an access device;

receiving a plurality of individually spoken characters over said initial communications network, said spoken characters having originated with said user at said access device, and wherein each of said spoken characters holds a position within said spoken characters;

converting said spoken characters into individual text characters using a speech-to-text engine, said text characters including a least one incorrect character;

converting, for one of said positions, a single spoken character into two text characters each having a confidence value output from said speech-to-text engine;

searching a website of a Web server using said individual text characters;

matching said individual text characters with a corresponding word on said website, said text characters not providing a perfect match with a portion of said word due to said incorrect character, wherein said text characters are matched with said word based in part upon said confidence values; and returning information corresponding to said word to said user over a return communications network.

2. A method as recited in claim 1 wherein said incorrect character occurs due to an error by said user or by an error by said speech-to-text engine.

3. A method as recited in claim 1 wherein said text characters provide a total length that is the same length as said word.

4. A method as recited in claim 1 wherein said matching occurs when at least one of said text characters does not match with the corresponding character of said word.

5. A method as recited in claim 1 wherein each text character has a confidence value output from said speech-to-text engine.

6. A method of searching a website using error correction, said method comprising:

accepting a call over an initial communications network from a user using an access device;

receiving a plurality of individually spoken characters over said initial communications network, said spoken characters having originated with said user at said access device, and wherein each of said spoken characters holds a position within said spoken characters;

converting said spoken characters into individual text characters using a speech-to-text engine;

converting, for one of said positions, a single spoken character into two text characters;

assigning a confidence value to each of said text characters by said speech-to-text engine;

searching a website of a Web server using said individual text characters;

matching said individual text characters with a corresponding word on said website by taking into account said confidence values of said text characters;

returning information corresponding to said word to said user over a return communications network.

7. A method as recited in claim 6 wherein said word is matched using the higher of said confidence values of said two text characters.

8. A method as recited in claim 6 wherein said spoken characters include at least one incorrect character due to a mistake of the user or due to a mistake of the speech-to-text engine.

9. A method as recited in claim 6 wherein said matched word includes a first word character having a position in said word corresponding to a first one of said text characters, said first word character being different from said first text character.

* * * * *